(12) United States Patent
Yost et al.

(10) Patent No.: US 8,462,229 B2
(45) Date of Patent: Jun. 11, 2013

(54) DETECTION OF FLICKER WITHIN CAPTURED IMAGED FRAMES

(75) Inventors: Jason Yost, Windsor, CO (US); Shane D. Voss, Fort Collins, CO (US); Robert P. Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 12/895,620

(22) Filed: Sep. 30, 2010

(65) Prior Publication Data

US 2012/0081569 A1  Apr. 5, 2012

(51) Int. Cl.
*H04N 9/73* (2006.01)
(52) U.S. Cl.
USPC ........................................ 348/226.1; 348/910
(58) Field of Classification Search
USPC .................... 348/226.1, 447, E5.11
See application file for complete search history.

(56) References Cited

U.S. PATENT DOCUMENTS

| | | | |
|---|---|---|---|
| 6,271,884 B1 * | 8/2001 | Chung et al. ................... | 348/370 |
| 6,519,002 B1 * | 2/2003 | Tomaszewski ............. | 348/226.1 |
| 6,710,818 B1 * | 3/2004 | Kasahara et al. ............. | 348/607 |
| 7,471,316 B2 | 12/2008 | Takahashi et al. | |
| 7,538,799 B2 | 5/2009 | Yanof | |
| 7,598,987 B2 | 10/2009 | Desprez-Le Goarant et al. | |
| 7,636,109 B2 | 12/2009 | Nakajima et al. | |
| 2002/0044205 A1 * | 4/2002 | Nagaoka et al. ............. | 348/229 |
| 2004/0201729 A1 * | 10/2004 | Poplin et al. ............... | 348/226.1 |
| 2005/0046704 A1 * | 3/2005 | Kinoshita ................... | 348/226.1 |
| 2005/0238259 A1 * | 10/2005 | Kim et al. ..................... | 382/312 |
| 2005/0246143 A1 * | 11/2005 | Han et al. ........................ | 702/189 |
| 2006/0279641 A1 * | 12/2006 | Takahashi et al. ......... | 348/226.1 |
| 2006/0290797 A1 * | 12/2006 | Tanaka et al. ................. | 348/297 |
| 2007/0052817 A1 * | 3/2007 | Kaplinsky et al. ......... | 348/226.1 |
| 2007/0247531 A1 * | 10/2007 | Deng et al. ................. | 348/226.1 |
| 2007/0263101 A1 * | 11/2007 | Cho et al. .................... | 348/226.1 |
| 2008/0049132 A1 * | 2/2008 | Suzuki .......................... | 348/308 |
| 2008/0278603 A1 * | 11/2008 | Lee et al. .................... | 348/226.1 |
| 2009/0033763 A1 * | 2/2009 | Tsukihara .................. | 348/226.1 |
| 2009/0219409 A1 * | 9/2009 | Mikami ..................... | 348/226.1 |
| 2010/0013953 A1 * | 1/2010 | Niikura ....................... | 348/226.1 |
| 2010/0045819 A1 * | 2/2010 | Pillman et al. ............. | 348/226.1 |
| 2010/0123810 A1 | 5/2010 | Greenland et al. | |
| 2011/0122304 A1 * | 5/2011 | Sedelnikov ................... | 348/294 |
| 2011/0149149 A1 * | 6/2011 | Jiao et al. ...................... | 348/447 |
| 2011/0157416 A1 * | 6/2011 | Chen .......................... | 348/227.1 |
| 2011/0187893 A1 * | 8/2011 | He et al. .................... | 348/226.1 |
| 2012/0154629 A1 * | 6/2012 | Horiuchi ................... | 348/226.1 |

* cited by examiner

*Primary Examiner* — Roberto Velez
*Assistant Examiner* — Abdelaaziz Tissire (57) ABSTRACT

A readout frequency of a sensor of a digital image capturing device is set based on a frequency of alternating current (AC) mains so that a readout period of the sensor of the digital image capturing device is not an integer multiple of a flicker period. The flicker period is equal to half of a period of the AC mains. A first image frame and a second image frame are captured using the sensor of the digital image capturing device. The second image frame is captured later in time than the first image frame. Whether flicker has occurred in the first and second image frames due to a periodic fluctuation of light emitted by a light source powered by the AC mains is detected by comparing a brightness of an area of the first image frame to a brightness of a corresponding area of the second image frame.

15 Claims, 5 Drawing Sheets

DETECTION OF FLICKER WITHIN CAPTURED IMAGED FRAMES

BACKGROUND

Digital image capturing devices include digital cameras and digital video cameras that can capture static images (i.e., digital pictures) and/or moving images (i.e., digital video). In general, a digital image capturing device includes a sensor. Light reflected off a subject scene is detected by the sensor to capture a digital image of the subject scene.

For one type of sensor, a digital image capturing device captures a digital image, which is referred to herein as an image frame, by briefly opening a shutter to completely expose the sensor. That is, the entire sensor is exposed at the same time. An example of this type of sensor is a charge-coupled device (CCD) sensor.

For another type of sensor, a digital image capturing device captures a digital image using a rolling shutter that exposes successive lines or rows of the sensor at a frequency referred to as the readout frequency. That is, just one line or row of the sensor is exposed at any given time. An example of this type of sensor is a complementary metal-oxide semiconductor (CMOS) sensor.

DETAILED DESCRIPTION OF THE DRAWINGS

As noted in the background section, a digital image capturing device may include a type of sensor such that the device captures a digital image using a rolling shutter that exposes successive lines or rows of the sensor at a readout frequency. Such types of sensors, which include complementary metal-oxide semiconductor (CMOS) sensors, are sometimes favored over other types of sensors, such as charge-coupled device (CCD) sensors, because they can be smaller and/or less expensive. For example, many camera phones include CMOS sensors for space and/or cost reasons.

A difficulty with a digital image capturing device that includes a sensor that has successive lines or rows that are exposed at a readout frequency is the susceptibility of the digital images captured by such a sensor to flicker. Flicker results from light sources, like incandescent lamps and fluorescent lamps, that are powered by alternating current (AC) mains, such as by the light sources being plugged into electrical power outlets. Such light sources can emit light that varies in brightness in correspondence with twice the frequency of the AC mains.

This variation in brightness is referred to as flicker. While the human eye generally does not perceive the flicker of these light sources, the digital images captured by sensors that have successive lines or rows that are exposed at a readout frequency can marred by such flicker in a way that is nevertheless typically immediately and easily perceivable to the human eye. In general, flicker manifests itself in digital images as a series of alternating dark and light bands corresponding to the variation in brightness of the light emitted by the light sources.

To overcome this problem, many types of digital image capturing devices attempt to detect flicker so that it can be compensated for either during the capture of a digital image, or after the capture of the digital image via some type of post-capture digital image processing. However, detecting flicker can be difficult. For instance, some types of scenes captured in digital images may have patterns that may be erroneously detected as flicker. As one example, natural sunlight streaming through partially open venetian blinds can be improperly detected as flicker.

Embodiments of the present disclosure attempt to make flicker easier to detect by appropriately setting the readout frequency of the sensor of a digital image capturing device. The readout frequency is set based on the frequency of the AC mains so that the corresponding readout period of the sensor is not an integer multiple of the flicker period, which is equal to half of the period of the AC mains. This ensures that if flicker is present, then the flicker will not occur in the same location at two image frames captured at different points in time.

Therefore, two image frames can be captured, and whether flicker has occurred in the image frames due to a periodic fluctuation of the light emitted by a light source powered by the AC means can be more easily detected. Specifically, the brightness of an area of one image frame is compared to the brightness of an area of a corresponding area of the other image frame. Whereas naturally occurring brightness patterns within the scenes captured in the image frames will generally be located in the same area in both image frames, the flicker will not. As such, the flicker can be more easily detected.

Figure 1:
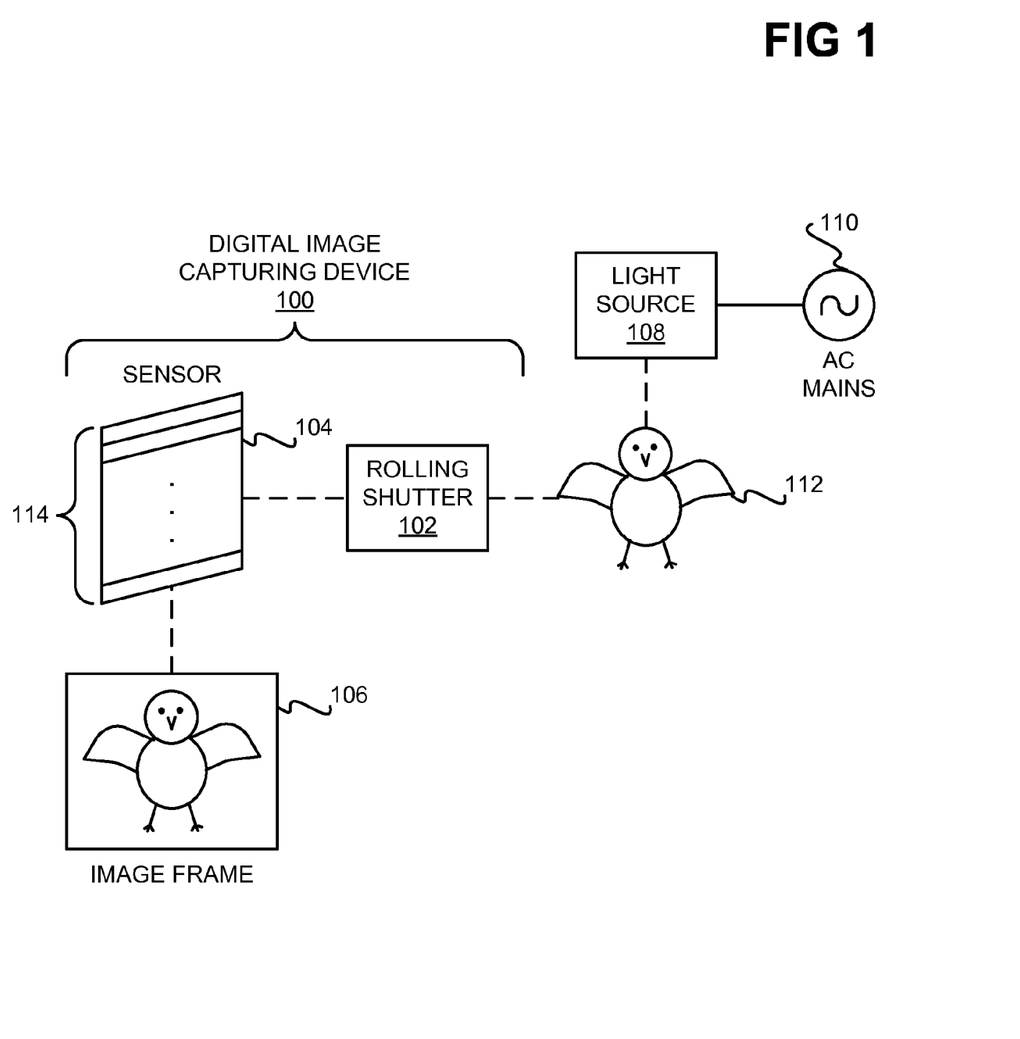
FIG. 1 is a diagram depicting how a digital image capturing device captures a digital image using a roller shutter in conjunction with a sensor, according to an embodiment of the disclosure.

FIG. 1 shows how a digital image capturing device 100 captures a digital image using a rolling shutter 102 in conjunction with a sensor 104, according to an embodiment of the disclosure. The digital image capturing device 100 can be a digital camera, a digital video camera, or another type of digital image capturing device that can capture static images and/or moving images. The digital image capturing device 100 captures an image frame 106, which may be a standalone digital image, or one frame of digital video.

A light source 108, such as an incandescent lamp or a fluorescent lamp, is powered by AC mains 110, such as by being plugged into an electrical power outlet. The light source 108 illuminates a subject 112 with light to be captured within the image frame 106 by the digital image capturing device 100. The light is thus reflected off the subject 112.

The rolling shutter 102 individually exposes successive lines or rows 114 of the sensor 104 to the light reflected off the subject 112 at a readout frequency to generate the image frame 106. The sensor 104 may be a CMOS sensor or another type of sensor that is not entirely exposed at one time. The image frame 106 thus is a digital representation of the subject 112.

The sensor 104 generates the image frame 106 within a length of time. This length of time is referred to as the readout period. The readout period is can include the time for the digital image capture device 100 to successively read out the lines or rows 114 of the sensor 104, as well as any delay that occurs between the last line or row of one captured image and the first line or row of the next captured digital image. The readout period is thus equal to one divided by the readout frequency at which the first line or row 114 of the sensor 104 of the digital image capturing device 100 is read out.

Figure 2:
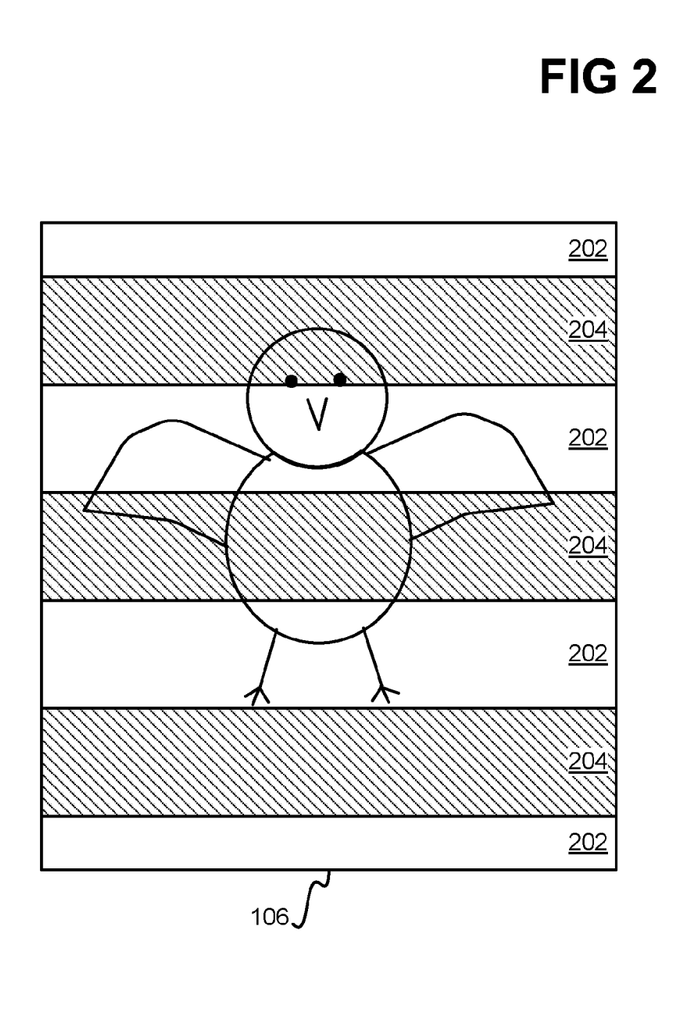
FIGS. 2 and 4 are diagrams depicted how flicker can manifest itself within an image frame, according to varying embodiments of the disclosure.

FIG. 2 shows how flicker can manifest itself within the image frame 106, according to an embodiment of the disclosure. Specifically, the flicker manifests itself as a series of dark bands 204 interleaved with a series of light bands 202. The light bands 202 correspond to maximum light being output by the light source 108, whereas the dark bands 204 correspond to minimum light being output by the light source 108, due to the fluctuation in the light emitted by the light source 108. It is noted that the transition from light bands to dark bands is more accurately sinusoidal in nature, but is shown as an immediate transition in FIG. 2 for illustrative convenience.

The dark bands 204 have a period equal to a flicker period, as do the light bands 202. The flicker period is equal to half of the period of the AC mains 110, which is itself equal to one divided by the frequency of the AC mains 110. The frequency of the AC mains 110 can vary depending on geographic location. For instance, North American AC mains operate at sixty hertz, whereas European AC mains operate at fifty hertz.

Figure 3:
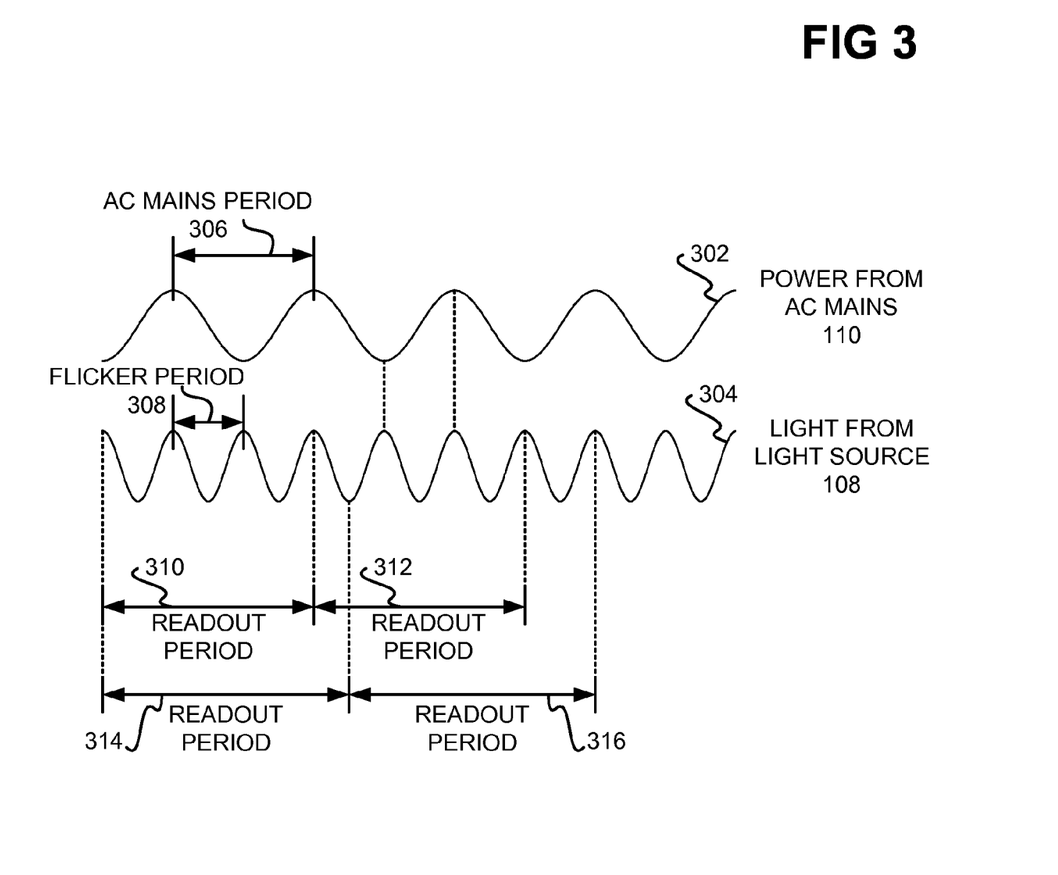
FIG. 3 is a diagram depicting the relationship between flicker and AC mains power, and how the readout frequency of a sensor can be adjusted so that flicker is more easily detected, according to an embodiment of the disclosure.

FIG. 3 shows the relationship between the flicker resulting from the fluctuation in the light emitted by the light source 108 and the power provided by the AC mains 110, and how the readout frequency of the sensor 104 can be adjusted so that the flicker is more easily detected within captured image frames, according to an embodiment of the disclosure. The signal 302 is a sine wave representing the AC power provided by the AC mains 110. The signal 302 has a period 306, which is referred to as the AC mains period.

By comparison, the signal 304 is a sine wave representing the light output by the light source 108. The signal 304 has a period 308, which is referred to as the flicker period. The flicker period 308 is equal to half of the AC mains period 306. As such, each peak in the AC power signal 302 corresponds to a peak in the light signal 304, and each trough in the AC power signal 302 also corresponds to a peak in the light signal 304. As an example, the frequency of the AC power provided by the AC mains 110 may be fifty hertz. As such, the AC mains period is one divided by fifty hertz, or twenty milliseconds. The flicker period is therefore one half of twenty milliseconds, or ten milliseconds.

To show how the readout frequency of the sensor 104 of the digital image capturing device 100 can be adjusted so that flicker is more easily detected, consider two image frames that are captured over successive readout periods 310 and 312 of the sensor 104, where the readout periods 310 and 312 are each equal to an integer multiple of the flicker period 308. In the specific example of FIG. 3, the readout periods 310 and 312 are each equal to thirty milliseconds, corresponding to a readout frequency of one divided by 0.03 seconds, or 33.33 hertz. The peaks and the troughs of the light signal 304 occur at the same relative times within both readout periods 310 and 312. For instance, each readout period 310 and 312 starts at a peak of the light signal 304, and ends at a peak of the light signal 304.

This means that the corresponding light and dark bands within the image frames captured during the readout periods 310 and 312 are located in corresponding spatial areas within the image frames. As such, it is difficult to detect flicker by comparing the two image frames to one another, because the light bands in the image frame captured in the readout period 310 occur in areas spatially corresponding to areas in which the light bands also occur in the image frame captured in the readout period 312. Similarly, the dark bands in the image frame captured in the readout period 310 occur in areas corresponding to areas in which the dark bands also occur in the image frame captured in the readout period 312.

For instance, assume that the subject 112 does not move between the capture of the image frame during the readout period 310 and the capture of the image frame during the readout period 312. Therefore, both of these image frames will be identical to the image frame 106 depicted in FIG. 2. As such, each such image frame begins with a light band 202 at the top, followed by a dark band 204, followed by light band 202, and so on.

Therefore, comparing the areas of the light bands 202 and the dark bands 204 within the image frame captured in the readout period 310 to the areas of the light bands 202 and the dark bands 204 within the image frame captured in the readout period 312 makes it difficult to determine whether the bands 202 and 204 result from flicker. Because the bands 202 and 204 have not moved in location from the image frame captured in the readout period 310 to the image frame captured in the readout period 312, the bands 202 and 204 may be naturally occurring within the subject 112 of the image frames. This is because, as noted above, one can expect there to be little or no movement of the subject 112 between the image frame captured in the readout period 310 and the image frame captured in the readout period 312. As such, it cannot be concluded whether the bands 202 and 204 result from flicker, or are naturally occurring within the subject 112 of the image frames.

Now, by comparison, consider two image frames that are captured over successive readout periods 314 and 316 of the sensor 104, where the readout periods 314 and 316 are not each equal to an integer multiple of the flicker period 308. Rather, in the example of FIG. 3, the readout periods 314 and 316 are each equal to thirty-five milliseconds, corresponding to a readout frequency of one divided by 0.035 seconds, or 28.57 hertz. More generally, the remainder of each readout period 314 and 316 divided by the flicker period 308 is equal to half of the flicker period 308. That is, the remainder of thirty-five (the readout period 314 or 316) divided by ten (the flicker period 308) is five, which is half of ten (the flicker period 308).

As such, the peaks and troughs of the light signal 304 occur at different relative times within the readout periods 314 and 316. For instance, the readout period 314 starts at a peak of the light signal 304, whereas the readout period 316 starts at a trough of the light signal 304. Similarly, the readout period 314 ends at a trough of the light signal 304, whereas the readout period 316 ends at a peak of the light signal 304.

This means that the corresponding light and dark bands within the image frames captured during the readout periods 314 and 316 are located in different spatial areas within the image frames. As such, it is easier to detect flicker by comparing the two image frames to one another, because the light bands in the image frame captured in the readout period 314 occur in areas corresponding to areas in which the dark bands occur in the image frame captured in the readout period 316. Similarly, the dark bands in the image frame captured in the readout period 314 occur in areas corresponding to areas in which the light bands occur in the image frame captured in the readout period 316.

Figure 4:
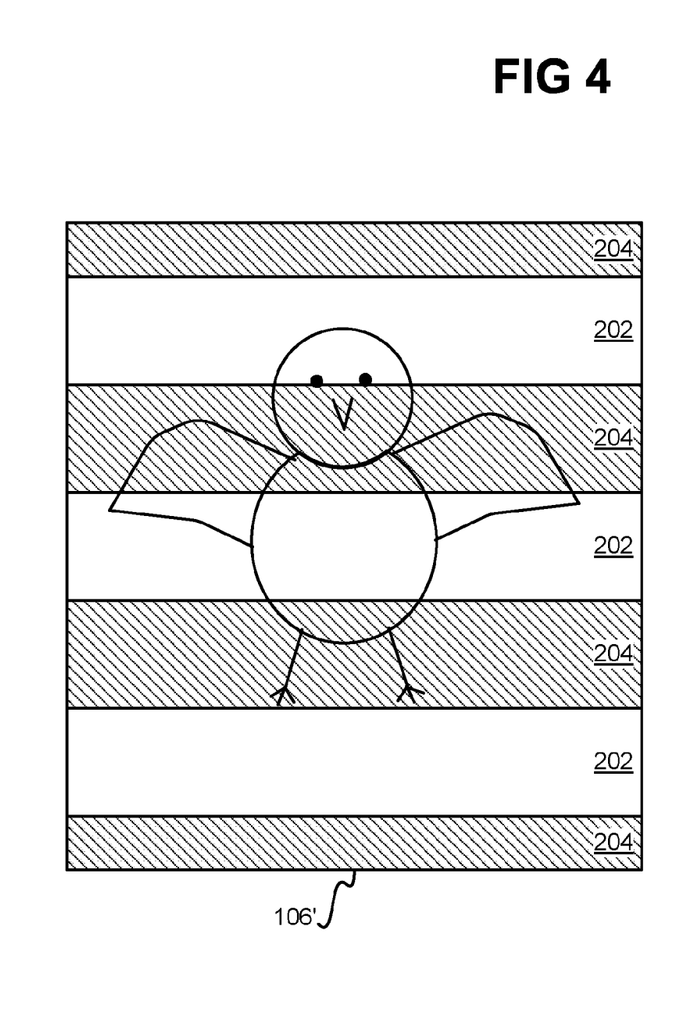

For instance, assume that the subject 112 does not move between the capture of the image frame during the readout period 314 and the capture of the image frame during the readout period 316. As such, the image frame captured during the readout period 314 will be identical to the image frame 106 depicted in FIG. 2, whereas the image frame captured during the readout period 314 will be identical to the image frame 106' depicted in FIG. 4. As such, the image frame 106 begins with a light band 202, followed by a dark band 204, followed by a light band 202, and so on, whereas the image frame 106' begins with a dark band 204, followed by a light band 202, followed by a dark band 204, and so on.

Therefore, comparing the areas of the light bands 202 and the dark bands 204 within the image frame captured in the readout period 314 to the areas of the light bands 202 and the dark bands 204 within the image frame captured in the readout period 316 makes it easier to determine whether the bands 202 and 204 result from flicker. Because the bands 202 have moved in location from the image frame captured in the readout period 314 to the image frame captured in the readout period 316, the bands 202 and 204 are not considered as naturally occurring within the subject 112 of the image frames. This is because, as noted above, one can expect there to be little or no movement of the subject 112 between the image frame captured in the readout period 314 and the image frame captured in the readout period 316. As such, it can be concluded that the bands 202 and 204 result from flicker in this case.

The embodiments of the disclosure thus make it easier to detect flicker within two image frames captured by the sensor 104 of the digital image capturing device 100, by adjusting the readout frequency of the sensor 104. The readout period of the sensor 104 is adjusted so that, generally, the readout period is not an integer multiple of the flicker period, where the flicker period is equal to half of the period of the AC mains 110. As such, the dark bands occur in different areas in the first image as compared to the second image, as do the light bands. Therefore, if these bands are detected in the first image in different areas than in the second image, then it can be concluded that the bands result from flicker. That is, since there is likely to be little or no movement of the subject 112 itself between the two images, the likelihood that the bands naturally occur within the subject 112 is small.

Figure 5:
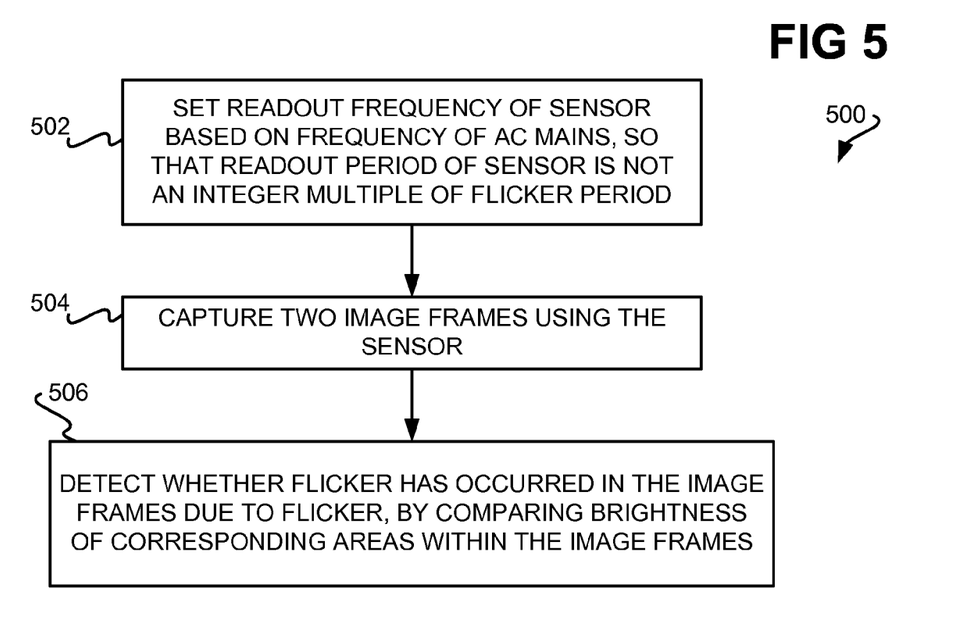
FIGS. 5 and 6 are each a flowchart of a method for improved flicker detection within image frames, according to varying embodiments of the disclosure.

FIG. 5 shows a method 500, according to an embodiment of the disclosure. As with other methods of embodiments of the disclosure, the method 500 may be implemented as a computer program stored on a non-transitory computer-readable data storage medium. The computer program can be executed by the digital image capturing device 100 to perform the method 500. For instance, the digital image capturing device 100 may have a processor that executes the computer program, or the computer program may be encoded as an application specific integrated circuit (ASIC), a field-programmable gate array (FPGA), or another type of integrated circuit (IC) that effectively executes the computer program.

The readout frequency of the sensor 104 is set based on the frequency of the AC mains 110, so that the readout period of the sensor 104 is not an integer multiple of the flicker period (502), which itself is equal to half of the period of the AC mains 110. The frequency of the AC mains 110 may not be known a priori. However, it may be presumed to be fifty hertz or sixty hertz.

It is noted that setting the readout frequency based on the frequency of the AC means so that the readout period is not an integer multiple of the flicker period does not encompass the situation where the readout frequency may fortuitously happen to be set such that the readout period is not an integer multiple of the flicker period. This is because in this case, the readout frequency is not actually set based on the frequency of the AC mains. Rather, the readout frequency is set based on one or more other criteria, such that it just so happens that the readout period is not an integer multiple of the flicker period. By comparison, setting the readout frequency based on the frequency of the AC mains means that the readout frequency is explicitly set based on a presumption of what the frequency of the AC mains is or is not.

If the frequency of the AC mains 110 is presumed to be fifty hertz, such that it is presumed that the frequency is not or cannot be sixty hertz, then the readout frequency of the sensor 104 can be set so that the remainder of the readout period divided by the flicker period is equal to half of the flicker period. For example, the readout period may be thirty-five or forty-five milliseconds, yielding a readout frequency of 28.57 or 22.22 hertz, respectively. If the frequency of the AC mains 110 is presumed to be sixty hertz, such that it is presumed that the frequency is not or cannot be fifty hertz, then the readout frequency of the sensor 104 can likewise be set so that the remainder of the readout period divided by the flicker period is equal to half of the flicker period. For example, the readout period may be 29.17 or 37.50 milliseconds, yielding a readout frequency of 34.28 or 26.67 hertz, respectively.

If the frequency of the AC mains 110 is presumed to be fifty hertz or sixty hertz, but it cannot be discounted that the frequency is not sixty hertz or fifty hertz, respectively, then the readout frequency of the sensor 104 can still be set so that the readout period of the sensor 104 is not an integer multiple of the flicker period. For instance, if the frequency of the AC mains 110 is fifty hertz, then the flicker period is ten milliseconds, whereas if the frequency of the AC mains 110 is sixty hertz, then the flicker period is 8.33 milliseconds. However, it is not known whether the frequency of the AC mains 110 cannot be fifty hertz, or whether the frequency of the AC mains 110 cannot be sixty hertz. Therefore, the readout frequency of the sensor 104 can be set so that the readout period of the sensor 104 is not an integer multiple of the flicker period, regardless of whether the flicker period is actually ten milliseconds or is actually 8.33 milliseconds. One such readout frequency is 28 hertz, or frames per second, which corresponds to a readout period of 35.71 milliseconds.

Once the readout frequency of the sensor 104 has been set, two image frames are captured using the sensor 104 (504). For instance, the rolling shutter 102 can be opened to expose the sensor 104 twice on a line or row-by-line or row basis at the readout frequency to capture two immediately adjacent image frames. Where the readout frequency of the sensor 104 has been set under the presumption that the frequency of the AC means 110 is presumed to be fifty hertz and not sixty hertz, or is presumed to be sixty hertz and not fifty hertz, the phase difference of the flicker between the first and the second image frames is maximized. For instance, the first image frame may be the image frame 106 of FIG. 2, and the second image frame may be the image frame 106' of FIG. 4. The phase difference of the flicker between the image frames 106 and 106' is maximized in that the exactly the areas where the light bands occur in the image frame 106 the dark bands correspondingly occur in the image frame 106', and vice-versa.

However, as noted above, the readout frequency of the sensor 104 may have been set under the presumption that the frequency of the AC means 110 is fifty hertz, but that it cannot be discounted that the frequency is not sixty hertz, or that the frequency of the AC means 110 is sixty hertz, but that it cannot be discounted that the frequency is not fifty hertz. In this case, the second image frame may still be captured immediately after the first image frame is captured, such that the second image frame is still an immediately adjacent and successive image frame to the first image frame. The phase difference of the flicker between the first and the second image frames is thus not maximized as compared to the case of the previous paragraph in which the readout frequency of the sensor 104 is set under the presumption of one particular flicker period. However, there will likely still be sufficient variation in location between the areas where the light and dark bands occur in the first image frame as compared to where they occur in the second image frame to detect whether flicker has occurred.

The method 500 concludes by detecting whether flicker has occurred in the two image frames, by comparing the brightness of corresponding areas between the two image frames (506). For example, if a particular area in the first image frame is light, but the corresponding particular area in the second image frame is dark, and this relationship holds for a number of different areas between the two image frames, then it can likely be concluded that flicker has occurred. By comparison, if a particular area in the first image frame is light, and the corresponding particular area in the second image frame is also light, and this relationship holds for a number of different areas between the two image frames, then it can likely be concluded that flicker has not occurred. Flicker may not occur where the image frames have been captured using sunlight, as opposed to using the light emitted by the light source 108. As another example, flicker may not occur where the image frames have been captured using a flash of the digital image capturing device itself that is much brighter than the light emitted by the light source 108.

Figure 6:
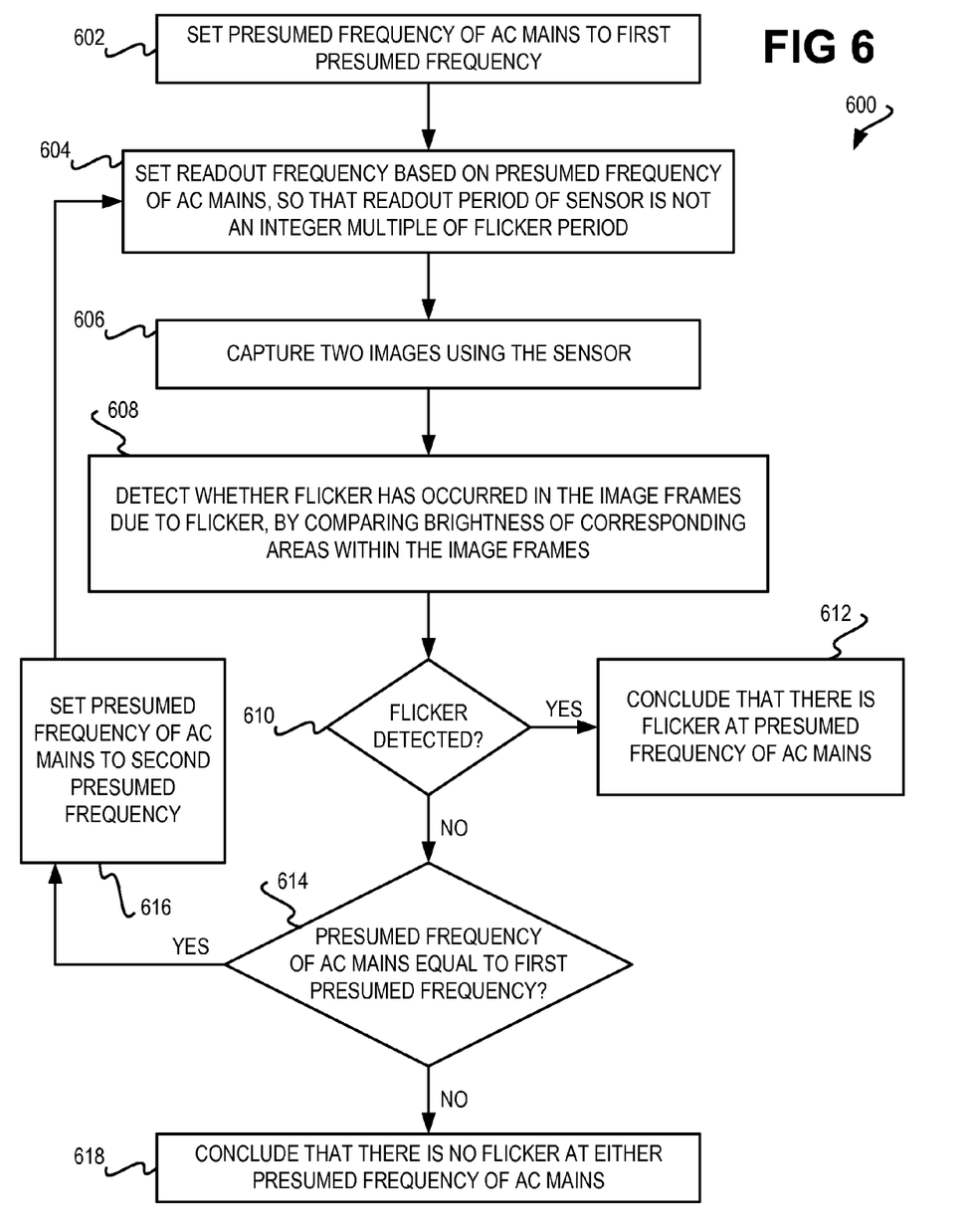

FIG. 6 shows a method 600, according to another embodiment of the disclosure. In the method 600, flicker is detected based on the frequency of the AC mains 110 being a first presumed frequency, such as 50 hertz, and then is detected based on the frequency of the AC mains 110 being a second presumed frequency, such as 60 hertz. As such, flicker can be optimally detected by capturing a maximum of four images, two where the readout frequency is set based on the frequency of the AC mains 110 being the first presumed frequency, and two where the readout frequency is set based on the frequency of the AC mains 110 being the second presumed frequency. The method 600 thus differs from the method 500. In the method 500, the flicker is detected based on the capture of just two images, where if the frequency of the AC mains 110 can be either the first or the second presumed frequency, the readout frequency is set so that the readout period is not an integer multiple regardless of the whether the frequency of the AC mains 110 is the first or the second presumed frequency.

The presumed frequency of the AC mains 110 is set to the first presumed frequency (602), such as 50 hertz. The readout frequency of the sensor 104 is set based on the presumed frequency of the AC mains, so that the readout period of the sensor 104 is not an integer multiple of the flicker period (604). The readout frequency of the sensor 104 is desirably set so that the phase difference of the flicker between two successive and adjacent captured image frames is maximized. That is, the readout frequency is desirably set so that the remainder of the readout period divided by the flicker period is equal to half of the flicker period, as described above in relation to the method 500.

Two image frames are then captured using the sensor 104 of the digital image capturing device 100 (606), and it is detected whether flicker has occurred in the two image frames by comparing the brightness of corresponding areas within the image frames (608), as has been described above in relation to the method 500. If flicker is detected (610), then it is concluded that there is flicker at the previously set presumed frequency of the AC mains 110 (612).

However, if flicker is not detected (610), and if the presumed frequency of the AC mains is equal to the first presumed frequency (614), then the presumed frequency of the AC mains is set to the second presumed frequency (616), such as sixty hertz. The method 600 is then repeated at part 602. If the method 600 also does not detect flicker at the second presumed frequency in part 608 when part 608 is performed the second time, then the method 600 proceeds from part 610 to part 614, and thereafter concludes that there is no flicker at either presumed frequency of the AC mains 110 (618).

The method 600 can be extended for the case where there are more than two presumed frequencies of the AC mains 110. In this case, the method 600 proceeds from part 614 to part 616 each time the presumed frequency of the AC mains 110 is not equal to the last presumed frequency. Furthermore, in part 616, the method 600 sets the presumed frequency to the next presumed frequency of the AC mains 110. The method 600 proceeds from part 614 to part 618 in this case just when no flicker has been detected at every presumed frequency of the AC mains 110.

Figure 7:
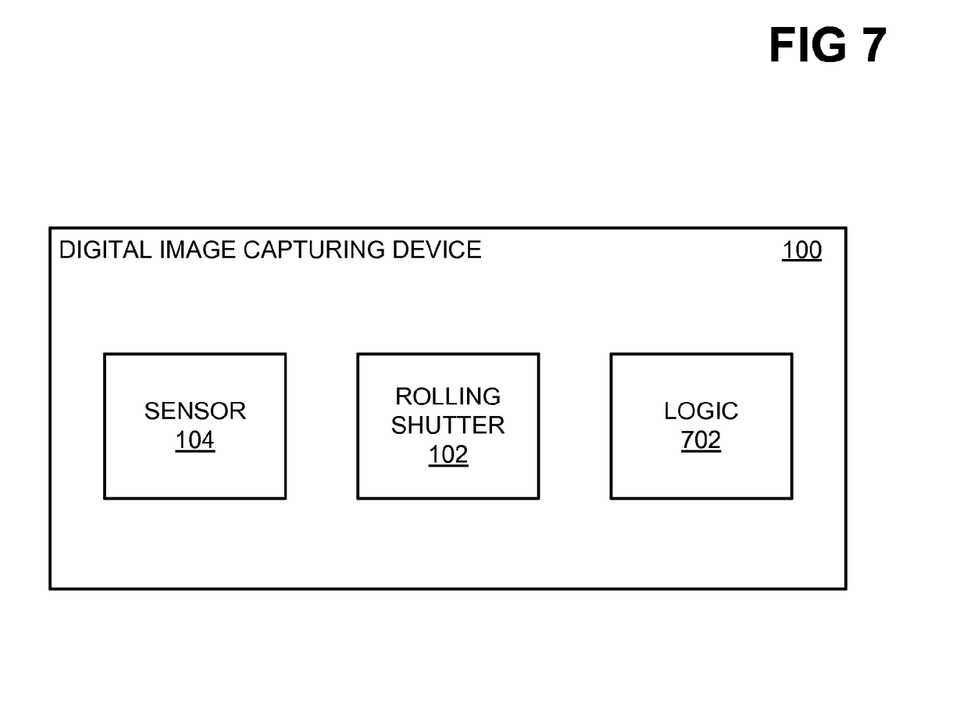
FIG. 7 is a block diagram of a rudimentary digital image capturing device, according to an embodiment of the disclosure.

In conclusion, FIG. 7 shows a block diagram of the digital image capturing device 100, according to an embodiment of the disclosure. The digital image capturing device 100 may be a standalone digital camera device, a standalone video camera device, or a device that includes digital image capturing capability. An example of the latter type of device is a camera phone, for instance.

The digital image capturing device 100 includes the sensor 104 and the rolling shutter 102 that have been described, as well as logic 702. The digital image capturing device 100 may further include other components, in addition to and/or in lieu of those depicted in FIG. 7. The sensor 104 is to capture images at a readout frequency, whereas the rolling shutter 102 is to expose the sensor 104 on a line or row-by-line or row basis at the readout frequency to capture each such image.

As has been described, the readout period is generally set so that the readout period is not an integer multiple of the flicker period. For instance, the readout period may be set so that the remainder of the readout period divided by the flicker period is equal to half of the flicker period. Stated another way, the readout period can be set equal to (N+½) or (N−½) times the flicker period for a given integer N. The integer N can be set so that flicker can be detected over two consecutive image frames. However, in general, the integer N is set so that flicker can be detected by comparing a first image frame and a second image frame, where the second image frame is captured later in time than the first image frame, and where the second image frame may or may not be consecutive to the first image frame.

As another example where the readout period is generally set so that it is not an integer multiple of the flicker period, the readout period may be set so that the remainder of the readout period divided by the flicker period is equal to 40% of the flicker period. Stated another way, the readout period can be set equal to (N+⅖) or (N−⅖) times the flicker period for a given integer N. The integer N is set so that flicker can be detected using two image frames, where the second image frame may or may not be consecutive to the first image frame.

The logic 702 may be implemented as a computer program stored on a non-transitory computer-readable data storage medium for execution by a processor of the digital image capturing device 100, or it may be implemented as an ASIC, FPGA, or another type of IC. The logic 702 is to perform the method 500 and/or the method 600. For instance, the logic 702 is to set the readout frequency based on the frequency of the AC mains 110 so that the readout period is not an integer multiple of the flicker period, and is to cause the sensor 104 to capture two image frames by causing the rolling shutter 102 to expose the sensor 104 twice. The logic 702 is then to detect whether flicker has occurred in the image frames due to a periodic fluctuation of the light source 108 powered by the AC mains 110.

We claim:

1. A method comprising:

setting a readout frequency of a sensor of a digital image capturing device based on a frequency of alternating current (AC) mains so that a readout period of the sensor of the digital image capturing device is not an integer multiple of a flicker period, the flicker period equal to half of a period of the AC mains;

capturing a first image frame and a second image frame using the sensor of the digital image capturing device, the second image frame captured later in time than the first image frame; and, detecting whether flicker has occurred in the first image frame and the second image frame due to a periodic fluctuation of light emitted by a light source powered by the AC mains, by:

determining a first brightness of an area of the first image frame, the area having a size less than a size of the first image frame;

determining a second brightness of an area of the second image frame corresponding to the area of the first image frame;

in response to determining that the first brightness is equal to the second brightness, determining that the first brightness and the second brightness are naturally occurring and that no flicker from the light source has occurred;

in response to determining that the first brightness is unequal to the second brightness, determining that the first brightness and the second brightness are not naturally occurring and that flicker from the light source has occurred.

2. The method of claim 1, wherein the frequency of the AC mains is a priori unknown, but is presumed to be one of fifty hertz and sixty hertz, and wherein the readout period is equal to one divided by the readout frequency, and the period of the AC mains is equal to one divided by the frequency of the AC mains.

3. The method of claim 1, wherein the readout frequency of the sensor is set to maximize a phase difference of the flicker between the first image frame and the second image frame, where the second image frame is an immediately adjacent and successive image frame to the first image frame.

4. The method of claim 3, wherein the readout frequency of the sensor is set so that a remainder of the readout period divided by the flicker period is equal to half of the flicker period.

5. The method of claim 1, wherein the frequency of the AC mains is one of a first AC mains frequency and a second AC mains frequency, such that the flicker period is one a first flicker period equal to half of a first AC mains period and a second flicker period equal to half of a second AC mains period, and wherein the readout frequency of the sensor is set so that the readout period is not an integer multiple of the first flicker period and is not an integer multiple of the second flicker period, such that comparing the brightness of the area of the first image frame to the brightness of the same area of the second image frame is performed to detect whether the flicker has occurred in the first image frame and the second image frame regardless of whether the frequency of the AC mains is actually the first AC mains frequency or the second AC mains frequency.

6. A non-transitory computer-readable data storage medium to store a computer program executed by a digital image capturing device to perform a method comprising:

setting a readout frequency of a sensor of the digital image capturing device based on a first presumed frequency of the AC mains so that a readout period of the sensor of the digital image capturing device is not an integer multiple of a first flicker period, the first flicker period equal to half of a first presumed period of the AC mains;

capturing a first image frame and a second image frame using the sensor of the digital image capturing device, the second image frame being an immediately adjacent and successive image frame to the first image frame; and, detecting whether first flicker has occurred in the first image frame and the second image frame due to a periodic fluctuation of a light source powered by the AC mains, by:

determining a first brightness of an area of the first image frame, the area having a size less than a size of the first image frame;

determining a second brightness of an area of the second image frame corresponding to the area of the first image frame;

in response to determining that the first brightness is equal to the second brightness, determining that the first brightness and the second brightness are naturally occurring and that no flicker from the light source has occurred;

in response to determining that the first brightness is unequal to the second brightness, determining that the first brightness and the second brightness are not naturally occurring and that flicker from the light source has occurred.

7. The non-transitory computer-readable data storage medium of claim 6, wherein the method further comprises, in response to detecting that the flicker has not occurred in the first image frame and the second image frame:

setting the readout frequency of the sensor of the digital image capturing device based on a second presumed frequency of the AC mains different than the first presumed frequency of the AC mains, so that the readout period of the sensor of the digital image capturing device is not an integer multiple of a second flicker period, the second flicker period equal to half of a second presumed period of the AC mains;

capturing a third image frame and a fourth image frame using the sensor of the digital image capturing device, the fourth image frame being an immediately adjacent and successive image frame to the third image frame; and, detecting whether second flicker has occurred in the third image frame and the fourth image frame due to the periodic fluctuation of the light emitted by the light source, by comparing a brightness of an area of the third image frame to a brightness of a corresponding area of the fourth image frame.

8. The non-transitory computer-readable data storage medium of claim 7, wherein the first presumed frequency of the AC mains is one of fifty hertz and sixty hertz, wherein where the first presumed frequency of the AC mains is fifty hertz, the second presumed frequency of the AC mains is sixty hertz, and wherein where the first presumed frequency of the AC mains is sixty hertz, the second presumed frequency of the AC mains is fifty hertz.

9. The non-transitory computer-readable data storage medium of claim 6, wherein the readout frequency of the sensor is set to maximize a phase difference of the first flicker between the first image frame and the second image frame.

10. The non-transitory computer-readable data storage medium of claim 9, wherein the readout frequency of the sensor is set so that a remainder of the readout period divided by the first flicker period is equal to half of the first flicker period.

11. A digital image capturing device comprising:
a sensor to capture images at a readout frequency; and,
logic to:
   set the readout frequency based on a frequency of alternating current (AC) mains so that a readout period is not an integer multiple of a flicker period, the flicker period equal to half of a period of the AC mains;
   cause the sensor to capture a first image frame and a second image frame, the second image frame captured later in time than the first image frame; and,
   detect whether flicker has occurred in the first image frame and the second image frame due to a periodic fluctuation of a light source powered by the AC mains, by:
      determining a first brightness of an area of the first image frame, the area having a size less than a size of the first image frame;
      determining a second brightness of an area of the second image frame corresponding to the area of the first image frame;
      in response to determining that the first brightness is equal to the second brightness, determining that the first brightness and the second brightness are naturally occurring and that no flicker from the light source has occurred;
      in response to determining that the first brightness is unequal to the second brightness, determining that the first brightness and the second brightness are not naturally occurring and that flicker from the light source has occurred.

12. The digital image capturing device of claim 11, wherein the frequency of the AC mains is a priori unknown, but is presumed to be one of fifty hertz and sixty hertz,
and wherein the readout period is equal to one divided by the readout frequency, and the period of the AC mains is equal to one divided by the frequency of the AC mains.

13. The digital image capturing device of claim 11, wherein logic is to set the readout frequency to maximize a phase difference of the flicker between the first image frame and the second image frame, where the second image frame is an immediately adjacent and successive image frame to the first image frame.

14. The digital image capturing device of claim 13, wherein the logic is to set the readout frequency so that a remainder of the readout period divided by the flicker period is equal to half of the flicker period.

15. The digital image capturing device of claim 11, wherein the frequency of the AC mains is one of a first AC mains frequency and a second AC mains frequency, such that the flicker period is one a first flicker period equal to half of a first AC mains period and a second flicker period equal to half of a second AC mains period,
and wherein the logic is to set the readout frequency so that the readout period is not an integer multiple of the first flicker period and is not an integer multiple of the second flicker period,
such that by comparing the brightness of the area of the first image frame to the brightness of the same area of the second image frame, the logic is to detect whether the flicker has occurred in the first image frame and the second image frame regardless of whether the frequency of the AC mains is actually the first AC mains frequency or the second AC mains frequency.

\* \* \* \* \*

UNITED STATES PATENT AND TRADEMARK OFFICE
CERTIFICATE OF CORRECTION

PATENT NO. : 8,462,229 B2
APPLICATION NO. : 12/895620
DATED : June 11, 2013
INVENTOR(S) : Jason Yost et al.

It is certified that error appears in the above-identified patent and that said Letters Patent is hereby corrected as shown below:

In the Specification

In column 2, line 66, delete "is can" and insert -- can --, therefor.

In the Claims

In column 9, line 53, in Claim 5, delete "one a" and insert -- one of a --, therefor.

In column 12, line 22, in Claim 15, delete "one a" and insert -- one of a --, therefor.

Signed and Sealed this
Twenty-fourth Day of September, 2013

Teresa Stanek Rea
*Deputy Director of the United States Patent and Trademark Office*